United States Patent [19]

Bosma et al.

[11] Patent Number: 5,576,077
[45] Date of Patent: Nov. 19, 1996

[54] RETARDATION LAYER HAVING THIN GLASS SUBSTRATES

[75] Inventors: Martin Bosma; Jan W. Venema; Stephen J. Picken, all of Arnhem; Gustaaf R. Möhlmann, Dieren, all of Netherlands

[73] Assignee: Akzo Nobel N.V., Arnhem, Netherlands

[21] Appl. No.: 312,029

[22] Filed: Sep. 26, 1994

[30] Foreign Application Priority Data

Sep. 29, 1993 [EP] European Pat. Off. .............. 93202788

[51] Int. Cl.$^6$ ................................................. G02F 1/1335
[52] U.S. Cl. ................................ 428/1; 428/220; 359/63; 359/73
[58] Field of Search ..................... 428/1, 220; 359/63, 359/64, 73

[56] References Cited

FOREIGN PATENT DOCUMENTS

| 380338 | 8/1990 | European Pat. Off. ...... G02F 1/1335 |
| 465107 | 1/1992 | European Pat. Off. ...... G02F 1/1335 |

OTHER PUBLICATIONS

Patent Abstract of Japanese Patent Publication No. 63/271, 428 (Nov./1988)–from European Patent Office.
Patent Abstract of Japanese Patent Publication No. 2/308, 225 (Feb./1990)–from European Patent Office.
Patent Abstract of Japanese Patent Publication No. 5/80,317 (Apr./1993)–from European Patent Office.

*Primary Examiner*—Alexander Thomas
*Attorney, Agent, or Firm*—Richard P. Fennelly; Louis A. Morris

[57] ABSTRACT

The present invention is in the field of retardation layers for liquid crystalline displays, more particularly in the field of retardation layers based on super-twisted nematic (STN) liquid crystalline layer. In the retardation layers of the present invention the liquid crystalline polymer is placed between glass substrates wherein at least one substrate has a thickness of 20–500 micrometers. The use of such thin glass substrates reduces the weight and thickness of the retardation layer.

The LC polymer film may also be placed between the substrate of the display cell and a thin glass substrate or between the polarizer and a thin glass substrate. In these embodiments of the invention a second thin glass substrate is not necessary and the thickness and weight of the retardation layer is further reduced.

7 Claims, 1 Drawing Sheet

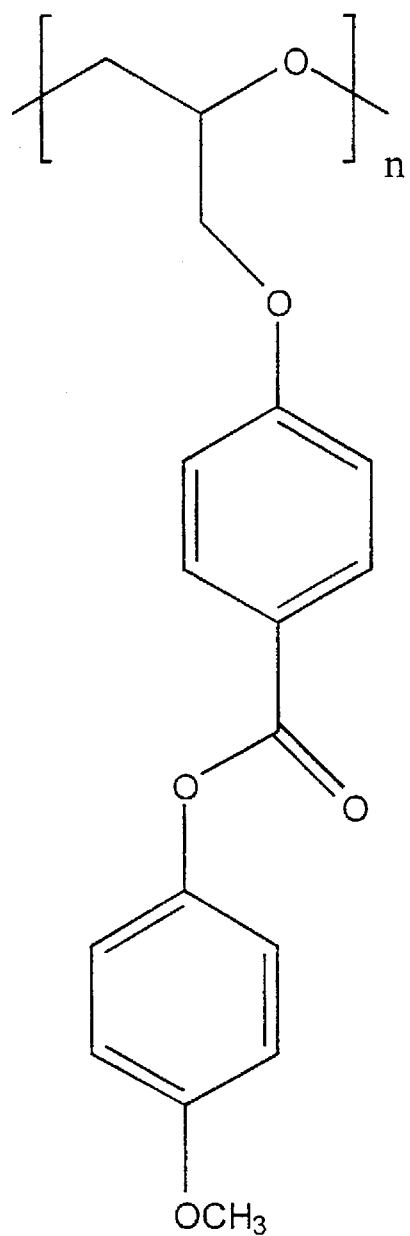

5,576,077

RETARDATION LAYER HAVING THIN GLASS SUBSTRATES

BACKGROUND OF THE INVENTION

The present invention is in the field of retardation layers for liquid crystalline displays comprising a twisted nematic liquid crystalline polymer film, more particularly in the field of retardation layers based on super-twisted nematic (STN) liquid crystalline layers. Such retardation layers are described in U.S. Pat. No. 5,382,648 and in European Patent Publication No. 380,338. For a further explanation of such retardation layers, reference may be had to these patent documents.

In theory, STN retardation layers can fully compensate the optical effects that occur in STN display cells. For this reason, STN retardation layers are regarded to be superior compared to uniaxially stretched polymer films. The required thickness of liquid crystalline polymer (LCP) STN retardation layers depends upon the birefringence of the LCP and is approximately 5–9 micrometers. Due to the low thickness of the LCP layer, in general, a suitable substrate (carrier) is used. Up until now, thick glass substrates (0.7 mm) have been used for low molecular twisted nematic materials. When used as such retardation layers, these thick substrates have several drawbacks. For example, these substrates are heavy and their use results in thick retardation layers.

BRIEF DESCRIPTION OF THE DRAWING

The Drawing, which forms a part of the present specification, depicts the structural formula for the transparent colorless nematic polyether polymer that was used in the Example.

DESCRIPTION OF THE INVENTION

The retardation layers according to the invention are characterized by placing the liquid crystalline polymer between glass substrates wherein at least one glass substrate has a thickness of 20–500 micrometers.

Liquid crystalline polymers have a higher mechanical strength than does a low molecular material. Therefore, glass substrates having a thickness of 20–500 micrometers, instead of thick glass substrates, may be used. By "liquid crystalline polymers" is meant: liquid crystalline polymers, liquid crystalline glasses and crosslinked liquid crystalline polymers.

On the thin glass substrates a polyamide orientation layer may be coated, cured and rubbed in the appropriate direction. A liquid crystalline polymer may be placed between the glass substrates having both a polyimide (PI) orientation layer.

The PI alignment layers can be replaced by other methods of inducing orientation, e.g. oblique evaporated SiO. The tilt of the uniform planar boundary conditions can be adjusted if necessary by the type of orienting layer and/or the used method of rubbing. The twisted retardation layer preferably possesses the same retardation value ($\Delta n \times d$), an equal twist angle, and an opposite twist direction compared to the liquid crystalline display cell. The retardation layer has to be transparent and colorless. Additional requirements include thermal stability, robustness and nontoxicity.

The twist angle of a (S)TN display cell is typically 240° but may be any other suitable value. In the case of an angle of rotation of 90° (or –90°), the film is generally called "twisted nematic". For a TFT-TN compensation layer a twist of 90° is required. If the angle of rotation is greater, the film is called "supertwisted nematic". In addition, this invention also concerns retardation layers with an angle of rotation smaller of 0° (no twist) to 90° (or –90°). For convenience, these layers are also called "twisted nematic" here. In the case of an angle of rotation of 0°, the arrangement of the liquid crystalline layer will be uniform planar. If dyes are blended in the liquid crystalline polymer, a retardation layer having an angle of rotation of 0° may be used as a polarizer. At angles of rotation exceeding 360° the structure goes through more than one full rotation within a single layer. The length covered by the structure in a full rotation is called "the pitch". The invention is also directed to retardation layers having more than one pitch (even more than 5 pitches). A twisted structure is obtained by giving one of the two substrates a different orientation direction from that of the other substrate. To control the direction of rotation of the director (to the left or to the right) and/or to obtain an angle of rotation greater than 90°, the liquid-crystalline material is frequently mixed with a chiral material: the so-called "chiral dopant". In principle, any optically active compound may be used to this end. As examples may be mentioned cholesterol derivatives and 4-(4-hexyloxy-benzoyloxy) benzene acid 2-octyl-ester. Ordinarily speaking, up to 5 wt. % of chiral dopant can be employed in relation to the total amount of liquid crystalline material. The required optically active material can also be included into the polymer itself (either in the polymer backbone and/or in the spacers connecting the mesogenic group to the backbone, and/or in the end-groups).

The value of optical retardation (=$\Delta n$ (birefringence) $\times$ d (thickness of the (S)TN layer) may be adjusted by choosing a proper value of the thickness of the layer. This can be done by using spacers of different sizes. This will often require an other polymer and/or dopant concentration in the polymer solution to be used for the spincoating.

The value of the optical retardation generally increases with the decreasing wavelength. Preferentially, the wavelength dependence (dispersion) of $\Delta n \times d$ of the display material and of the LC-material used for the retardation layer are equal. The wavelength dependence may be varied by changing the LC material. The LC material may be either a nematic LC polymer, a nematic LC-glass or a nematic LC monomer. The LC monomer has to be cross-linked after the orientation process to obtain the required mechanical strength. It is important for the material to have a sufficiently low viscosity in the nematic phase as otherwise the processing time will be unacceptably long. It may also be useful to fine tune the dispersion of the birefringence by using polymer blends or co-polymers.

The LC polymer film may also be placed between the substrate of the display cell and a thin glass substrate. In a further embodiment of the invention the LC polymer film is placed between the polarizer and a thin glass substrate. In these embodiments of the invention a second thin glass substrate is not necessary and the thickness and weight of the retardation layer is further reduced.

The invention will be further illustrated with reference to the following nonlimiting Example.

EXAMPLE

The procedure which follows was used to make the STN layer.

Two glass substrates having a thickness of 100 micrometer were coated with Merck Liquicoat® PA polyimide (PI)

resin, were pre-cured at 60° C. for fifteen minutes, were then cured at 300° C. for one hour, and were then rubbed in the appropriate direction on a felt cloth in accordance with the instructions provided by Merck. To insure proper adhesion of the PI layer, the glass substrates were cleaned in advance using the following procedure:

ultra-sonic cleaning with a detergent (Q9 brand, from Purum GmbH);

KOH (1M), 50° C. for one hour;

$HNO_3/H_2SO_4/H_2O$ (1:1:2), 60° C. for one hour; and reflux in isopropylalcohol vapor for thirty minutes or more.

Between each cleansing step, a rinsing with demi water was performed. This is a variation on the method as described by W. H. de Jeu in "Physical properties of Liquid Crystals", 1st edition, p.23, Gordon and Breach Science Publishers.

The composition shown in FIG. 1 was used as a polymer. This was a transparent colorless nematic polyether with a Tg of 45°/51° C. and an NI clearing point of 145° C. The molecular weight (Mw) was about 3,000, and the dispersion of the molecular weight (Mw/Mn) was 1.1. The birefringence of this polymer, as determined using an Abbe refractometer, was about 0.15–0.20 depending on the rate of cooling and the wavelength. This was comparable to the birefringence of active liquid crystalline display mixtures. The required amount of chiral dopant (e.g. Merck CB15) was measured using a Cano wedge and was found to be 2% (w/w) for the desired STN layer twist of 240° and a layer thickness of 6.0 µm. This dopant leads to a clockwise twist. To obtain this layer thickness, cross-linked polymer spheres were used (Dynospheres DL-1060 brand, from JSR). About 0.5% (w/w, based on polyether weight) of these spheres were added to a 25% (w/w) dichloromethane solution of the polymer. Prior to this the polymer solution was filtered over a 0.5 µm Teflon fluoropolymer filter to remove dust, etc. The polymer solution with the spheres and chiral dopant was spincoated on both of the rubbed PI-glass substrates at 1500 rpm/20° C. in a saturated dichloromethane environment. The spincoating was performed in a dust free cabinet. The obtained polymer layer thickness was about 4 µm. The obtained slides with polymer were dried in a vacuum stove for sixteen hours at 20° C.

To make the STN cell, the slides were assembled at an orientation of 60° of the respective rubbing directions. The sample was placed in an isostatic press which was evacuated and then brought to 160° C. After this, the sample was slowly cooled to 125° C. where it was kept for about four hours and then cooled to room temperature. The quality of the thus obtained STN layer was evaluated by established optical techniques, e.g. E. P. Raynes, Molecular Crystals, Liquid Crystals Letters, 4(3–4), 69–75 (1987).

The foregoing Example should not be construed in a limiting sense since it is intended to describe only one embodiment of the claimed invention. The scope of protection sought is set forth in the Claims which follow.

We claim:

1. A retardation layer for a liquid crystalline display comprising a twisted nematic or supertwisted nematic liquid crystalline polymer which is placed between glass substrates wherein at least one glass substrate has a thickness of 20–500 micrometers and is provided with an orientation layer.

2. A retardation layer according to claim 1 wherein at least one of the substrates has a thickness of 30–100 micrometers.

3. A retardation layer according to either claim 1 or 2 wherein the liquid crystalline polymer is placed between a glass substrate with a thickness of 20–500 micrometers and a glass substrate of a display cell.

4. A retardation layer according to either claim 1 or 2 wherein the liquid crystalline polymer is placed between a glass substrate with a thickness of 20–500 micrometers and a polarizer of a display cell.

5. A retardation layer for a liquid crystalline display comprising a twisted nematic or supertwisted nematic liquid crystalline polymer structure comprising more than one pitch which is placed between glass substrates wherein at least one glass substrate has a thickness of 20–500 micrometers.

6. A polarizer comprising a uniform planar oriented liquid crystalline polymer and a dye, characterized in that the liquid crystalline polymer is placed between substrates wherein at least one substrate has a thickness of 20–500 micrometers.

7. A retardation layer for a liquid crystalline display comprising a twisted nematic or supertwisted nematic liquid crystalline polymer structure comprising more than one pitch which is placed between glass substrates wherein at least one glass substrate has a thickness of 30–100 micrometers.

* * * * *